United States Patent
Nagano et al.

(10) Patent No.: US 10,486,487 B2
(45) Date of Patent: Nov. 26, 2019

(54) STABILIZER AND METHOD OF MANUFACTURING THE SAME

(71) Applicants: Toyota Jidosha Kabushiki Kaisha, Toyota-shi, Aichi-ken (JP); Kyoei Manufacturing Co., Ltd., Hamamatsu-shi, Shizuoka-ken (JP)

(72) Inventors: Shuzo Nagano, Nagoya (JP); Yoshiyuki Mori, Nissin (JP); Arata Mikami, Nagoya (JP); Nobuaki Taguchi, Hamamatsu (JP); Koji Yamaguchi, Hamamatsu (JP)

(73) Assignees: Toyota Jidosha Kabushiki Kaisha, Toyota-shi, Aichi-ken (JP); Kyoei Manufacturing Co., Ltd., Hamamatsu-shi, Shizuoka-ken (JP)

( * ) Notice: Subject to any disclaimer, the term of this patent is extended or adjusted under 35 U.S.C. 154(b) by 224 days.

(21) Appl. No.: 15/657,313

(22) Filed: Jul. 24, 2017

(65) Prior Publication Data

US 2018/0029435 A1 Feb. 1, 2018

(30) Foreign Application Priority Data

Jul. 26, 2016 (JP) .................................. 2016-145933

(51) Int. Cl.
*B21D 31/00* (2006.01)
*B60G 21/055* (2006.01)
(Continued)

(52) U.S. Cl.
CPC ......... *B60G 21/055* (2013.01); *B21D 22/025* (2013.01); *B21D 22/225* (2013.01);
(Continued)

(58) Field of Classification Search
CPC .......... B60G 21/055; B60G 2204/1224; B60G 2206/012; B60G 2206/427;
(Continued)

(56) References Cited

U.S. PATENT DOCUMENTS

| | | | | |
|---|---|---|---|---|
| 1,882,352 A | * | 10/1932 | Woodhead | ................. B21J 1/06 29/897.2 |
| 2,053,975 A | * | 9/1936 | Spatta | ...................... B21K 1/26 29/DIG. 43 |

(Continued)

FOREIGN PATENT DOCUMENTS

| | | |
|---|---|---|
| EP | 2687392 A1 | 1/2014 |
| JP | S5973136 A | 4/1984 |

(Continued)

*Primary Examiner* — David B Jones
(74) *Attorney, Agent, or Firm* — Dinsmore & Shohl LLP (57) ABSTRACT

A stabilizer having a tubular shape is provided so as to extend in a widthwise direction of a vehicle and coupled to a suspension arm at opposite end portions of the stabilizer. Each of the opposite end portions includes: a first large-diameter bar portion having an outside diameter greater than an outside diameter of an intermediate portion of the stabilizer; and a second large-diameter bar portion having an outside diameter greater than the outside diameter of the first large-diameter bar portion and having a wall thickness greater than a wall thickness of the intermediate portion.

10 Claims, 4 Drawing Sheets

(51) Int. Cl.
*B21D 22/22* (2006.01)
*B21D 22/02* (2006.01)

(52) U.S. Cl.
CPC ............... *B60G 2204/1224* (2013.01); *B60G 2206/012* (2013.01); *B60G 2206/427* (2013.01); *B60G 2206/81* (2013.01); *B60G 2206/8103* (2013.01)

(58) Field of Classification Search
CPC ........ B60G 2206/81; B60G 2206/8103; B21D 41/026; B21D 41/04; B21D 22/025; B21D 22/225; B21D 51/2615; B21J 1/06; B21J 5/08; B21K 1/10; B21K 1/26; B21K 21/12; B21C 37/16
USPC ....................................................... 72/355.4
See application file for complete search history.

(56) References Cited

U.S. PATENT DOCUMENTS

| | | | | |
|---|---|---|---|---|
| 2,313,116 | A * | 3/1943 | Babcock | B21J 1/06 72/342.1 |
| 3,668,918 | A * | 6/1972 | Benteler | B21K 1/10 138/109 |
| 4,845,972 | A * | 7/1989 | Takeuchi | B21J 5/08 72/370.03 |
| 4,854,149 | A * | 8/1989 | Porucznik | B21D 51/2615 72/352 |
| 5,379,625 | A * | 1/1995 | Hale | B21D 41/04 72/318 |
| 5,517,843 | A * | 5/1996 | Winship | B21C 37/16 72/306 |
| 5,956,988 | A * | 9/1999 | Beste | B21J 5/08 72/367.1 |
| 7,275,407 | B2 * | 10/2007 | Ginsberg | B21C 37/16 72/318 |
| 9,561,537 | B2 * | 2/2017 | Kirby | B21J 5/08 |
| 2007/0256467 | A1 | 11/2007 | Viegner et al. | |
| 2014/0020228 | A1 | 1/2014 | Janzen et al. | |

FOREIGN PATENT DOCUMENTS

| | | |
|---|---|---|
| JP | S60142109 U | 9/1985 |
| JP | S6346913 A | 2/1988 |
| JP | S63312213 A | 12/1988 |
| JP | 2007-512140 A | 5/2007 |
| WO | 2005061148 A1 | 7/2005 |

* cited by examiner

STABILIZER AND METHOD OF MANUFACTURING THE SAME

CROSS REFERENCE TO RELATED APPLICATION

The present application claims priority from Japanese Patent Application No. 2016-145933, which was filed on Jul. 26, 2016, the disclosure of which is herein incorporated by reference in its entirety.

BACKGROUND

The following disclosure relates to a stabilizer provided on a suspension device of a vehicle and to a method of manufacturing the stabilizer.

Patent Document 1 (Japanese Patent Application Publication No. 63-312213) and Patent Document 2 (Japanese Patent Application Publication No. 63-46913) disclose stabilizers each formed of a pipe material and welded and fixed to a suspension arm at opposite end portions of the stabilizer. Not a thickening working but an expansion working is performed for the opposite end portions of the stabilizer disclosed in Patent Document 1. Description at lines 5-9 in the lower left column on page 2 in Patent Document 1 contains "since the section modulus z' is increased by increase in diameter, enough strength is obtained for stabilizer mounting without thickening working, thereby achieving a stabilizer formed of a pipe without wasted materials". Patent Document 2 discloses that end-portion-thickening cylinders are fitted on the pipe material at the opposite end portions of the stabilizer and caulked and merged with each other by a press fit of a cored bar into the pipe material. This process expands and thickens the opposite end portions of the stabilizer.

Patent Document 3 (Japanese Patent Application Publication No. 59-73136) discloses a stabilizer formed of a pipe material. One end portion of this stabilizer has an outside diameter less than that of an intermediate portion of the stabilizer. This end portion is serrated on its inner circumferential surface. The other end portion of this stabilizer has an outside diameter greater than that of the intermediate portion of the stabilizer. This end portion is serrated on its outer circumferential surface. An arm for torque transmission is mounted on the one end portion of the stabilizer using the serrations. The other end portion is mounted on a suspension arm using the serrations.

SUMMARY

Accordingly, an aspect of the disclosure relates to manufacturing of a stabilizer by performing an expansion and thickening working on an end portion of a raw tube satisfactorily and at low cost without using an end-portion-thickening cylinder. In the following description increasing the diameter may be hereinafter referred to as "expanding".

One aspect of the disclosure is a method of manufacturing a stabilizer by increasing a diameter and a thickness of an end portion of a workpiece as a raw tube, using (i) a punch having a large-diameter portion whose outside diameter is greater than the inside diameter of the raw tube and (ii) a die shaped to have an inside diameter that changes in an axial direction, the die comprising a recessed portion comprising: a small-diameter recessed portion; a medium-diameter recessed portion; and a large-diameter recessed portion having an inside diameter greater by a value obtained by adding a value that is twice a wall thickness of the raw tube to the outside diameter of the large-diameter portion of the punch. In the present manufacturing method, the punch is inserted into an inner circumferential side of the workpiece in a state in which the workpiece is held by the small-diameter recessed portion of the die. The diameter of an end portion of the workpiece is increased by the large-diameter portion of the punch at portions of the workpiece which correspond to the medium-diameter recessed portion and the large-diameter recessed portion of the die. The workpiece is then deformed by a pressing force. As a result, the outside diameter of the end portion of the workpiece is made substantially equal to the inside diameter of the large-diameter recessed portion of the die, and the wall thickness is made substantially equal to a distance between an inner circumferential surface of the large-diameter recessed portion of the die and an outer circumferential surface of the large-diameter portion of the punch. The end portion of the workpiece is expanded so as to form two step portions thereon and is thickened. As a result, the workpiece has a shape whose diameter changes with three steps.

In the case where the end-portion-thickening cylinder is used as disclosed in Patent Document 2, the number of manufacturing steps and the number of components are increased, resulting in higher manufacturing cost. In the present manufacturing method, in contrast, the end-portion-thickening cylinder is not used, and it is possible to manufacture the stabilizer at lower cost accordingly. Also, a large pressing force applied to the workpiece in the axial direction is received at least by a wall portion of the die which is located between the small-diameter recessed portion and the medium-diameter recessed portion and by a wall portion of the die which is located between the medium-diameter recessed portion and the large-diameter recessed portion. As a result, when compared with the case where a single wall portion is provided, a smaller force acts on each of the wall portions, resulting in less damage to the die and a longer useful life. This also reduces cost of the stabilizer.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
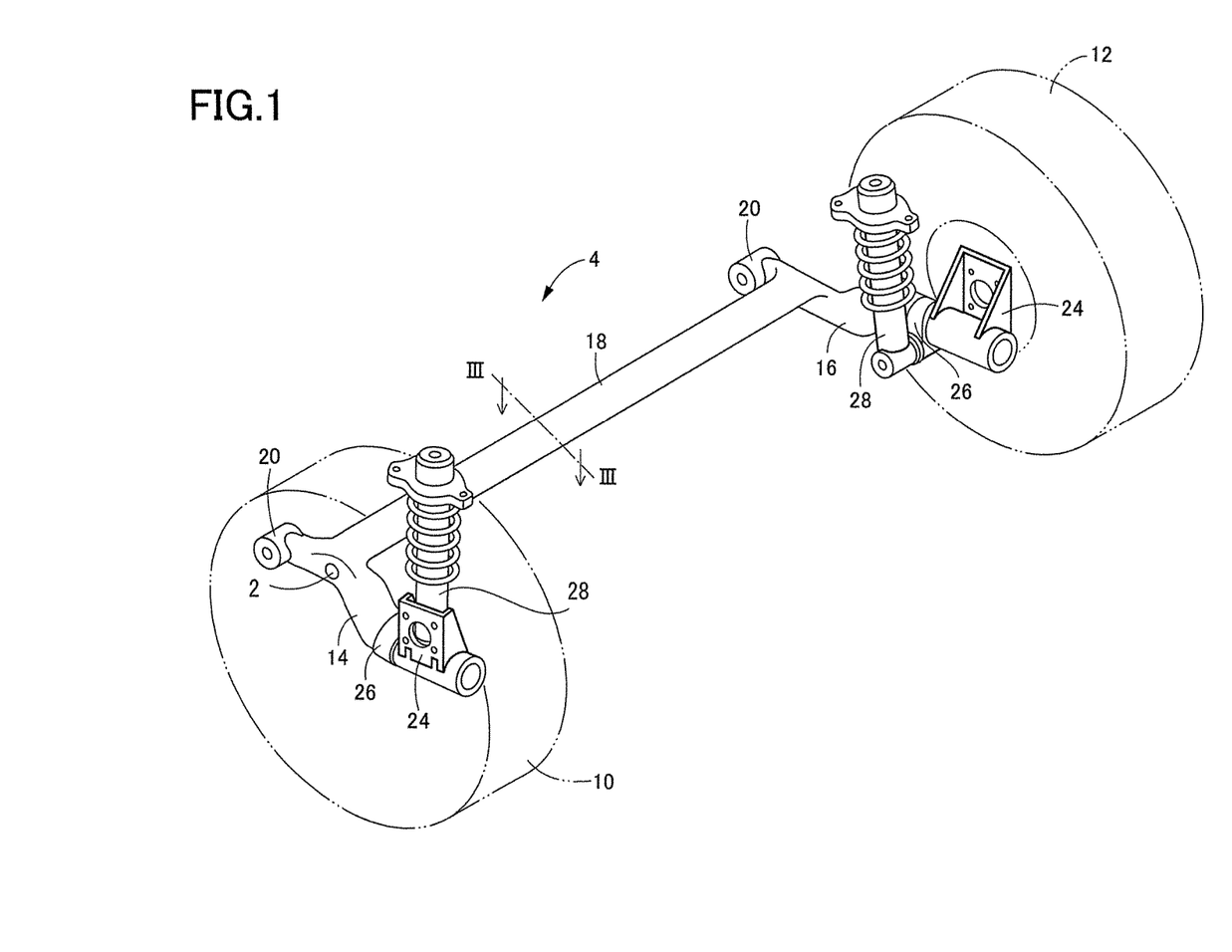
FIG. 1 is a perspective view schematically illustrating a suspension device including a stabilizer according to a first embodiment.

There will be described a stabilizer and a method of manufacturing the stabilizer according to a first embodiment. FIG. 1 illustrates a suspension device 4 including a stabilizer 2. This suspension device 4 is a torsion beam suspension provided on rear wheels of a vehicle. The suspension device 4 includes: a pair of trailing arms 14, 16 provided respectively for a rear left wheel 10 and a rear right wheel 12; and a plate-like torsion beam 18 and the cylindrical stabilizer 2 for coupling the trailing arms 14, 16 to each other; and shock absorbers 28 held by absorber brackets 26 provided for the respective trailing arms 14, 16.

Each of the trailing arms 14, 16 is provided so as to extend in the longitudinal direction of the vehicle. Each of the trailing arms 14, 16 is held at its one end portion by a vehicle body, not illustrated, via a bushing 20 so as to be pivotable about an axis extending in a widthwise direction of the vehicle. Each of the trailing arms 14, 16 at the other end portion holds a corresponding one of the rear left wheel 10 and the rear right wheel 12 via a carrier bracket 24 so as to allow rotation of the wheel.

Figure 2:
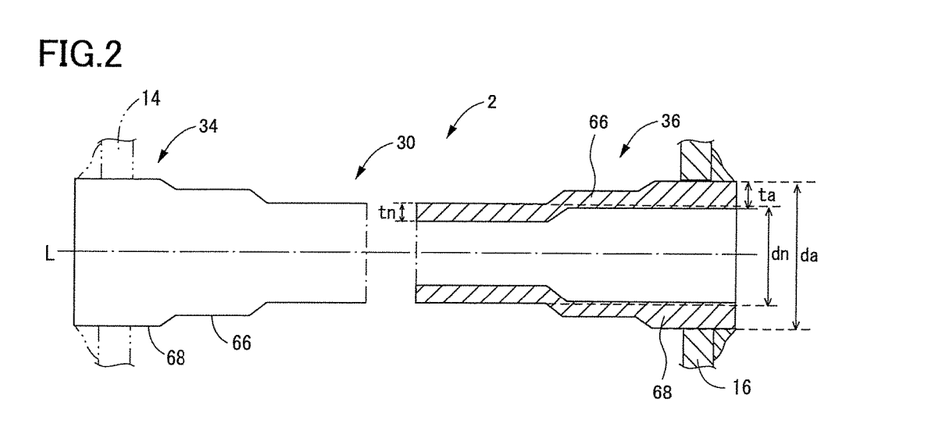
FIG. 2 is a cross-sectional view of a portion of the stabilizer.
Figure 3:
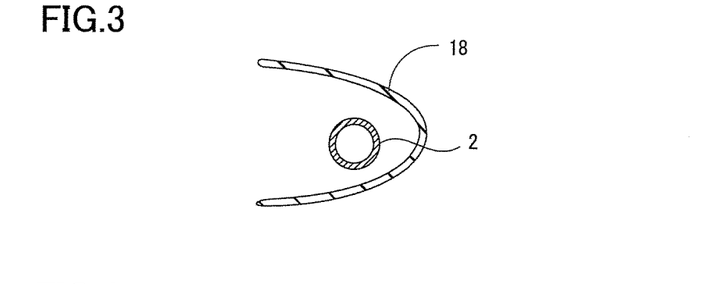
FIG. 3 is a cross-sectional view taken along line III-III in FIG. 1.

Each of the stabilizer 2 and the torsion beam 18 is provided so as to extend in the widthwise direction of the vehicle. As illustrated in FIG. 2, the stabilizer 2 is shaped like a tube extending in a direction parallel with an axis L (hereinafter may be referred to as "axial direction"). The stabilizer 2 includes: an intermediate portion 30 having a substantially constant outside diameter; and opposite end portions 34, 36 each having an outside diameter which changes in the axial direction. As illustrated in FIG. 3, the torsion beam 18 is constituted by a bent plate, and the stabilizer 2 is located inside the bent plate.

In the suspension device 4, when a difference occurs between contact surfaces of the rear left wheel 10 and the rear right wheel 12 with the ground in the up and down direction, a torsional moment and a bending moment act on the torsion beam 18 and the stabilizer 2 via the trailing arms 14, 16. In this case, the torsion beam 18 mainly receives the bending moment, and the stabilizer 2 mainly receives the torsional moment.

Ensured torsional stiffness and weight reduction are demanded of this stabilizer. To satisfy this demand, it is possible to consider that the stabilizer is formed of a high-strength material and made short. With this construction, however, the stabilizer is more frequently used under high stress, and the torsion angle of the stabilizer is larger in the case of the same torsional torque. This requires higher fatigue strength at weld portions. However, use of the high-strength material does not always increase the fatigue strength at the weld portions. Also, a materials design is required in some cases to increase the fatigue strength at the weld portions, for example. In view of the above-described situations, the present inventors have discussed expansion and thickening of the weld portions of the stabilizer to increase a polar moment of inertia of area in cross section. The increase in polar moment of inertia of area in cross section reduces distortion created at the weld portions in the case of the same torsional torque, resulting in increase in the fatigue strength.

While end portions of the stabilizer are in most cases worked by a press working machine using a metal mold, formability of a high-strength material is low. Thus, it is difficult to increase an expansion ratio in the case where the diameter of the end portion of the stabilizer is increased with one step portion. In the case where a high-strength material is plastically deformed, a large force needs to be applied to a workpiece to increase a thickening ratio, which may cause a die to receive a large force, leading to damage to the die, for example. That is, a useful life of equipment (e.g., the metal mold) may be shortened. On the other hand, in the case where an end-portion-thickening cylinder is used, it is possible to expand and thicken the end portion of the stabilizer at a desired expansion ratio and a desired thickening ratio. However, the number of manufacturing steps and the number of components are increased, leading to higher cost.

To solve these problems, in the present embodiment, the stabilizer 2 is manufactured by performing an expansion and thickening working on opposite end portions of a raw tube extending in the axial direction, not using the end-portion-thickening cylinder but using (i) a die 40 having recessed portions having different inside diameters and (ii) an expansion punch 42 having a large-diameter portion whose outside diameter is greater than the inside diameter of the raw tube.

In the following description in the present embodiment, the raw tube is a tube at a time before the expansion and thickening working is performed, that is, the raw tube is a tube for which neither an expansion working nor a thickening working is performed, and the workpiece is a workpiece at a time before the workpiece is molded into a shape of the stabilizer 2, that is, the workpiece is the raw tube or a subject for the expansion and thickening working. It is considered that the outside diameter and the wall thickness of the raw tube are substantially equal to the outside diameter dn and the wall thickness to of the intermediate portion 30 of the stabilizer 2, respectively.

Figure 4:
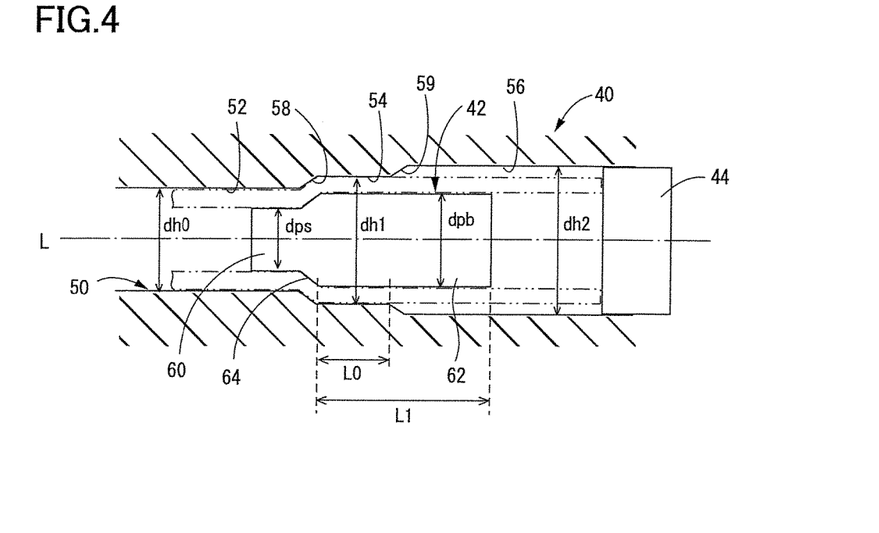
FIG. 4 is a view conceptually illustrating a metal mold used for manufacture of the stabilizer.

As illustrated in FIG. 4, a metal mold used in a press working machine for manufacturing the stabilizer 2 includes: the die 40; the expansion punch 42 as one example of a punch; and a pressing punch 44. The die 40 is separable into a plurality of portions in a direction parallel with the axis L. The die 40 has a recessed portion 50 with a stepped shape whose inside diameter changes in the axial direction. Specifically, the recessed portion 50 includes a small-diameter recessed portion 52, a medium-diameter recessed portion 54, and a large-diameter recessed portion 56 which have different inside diameters. In other words, a circumferential wall defining the recessed portion 50 of the die 40 has a stepped shape. The recessed portion 50 includes: a wall portion 58 formed between a circumferential wall defining the small-diameter recessed portion 52 and a circumferential wall defining the medium-diameter recessed portion 54; and a wall portion 59 formed between a circumferential wall defining the medium-diameter recessed portion 54 and a circumferential wall defining the large-diameter recessed portion 56. Each of the wall portion 58 and the wall portion 59 has an inclined surface having an inside diameter that changes continuously. It is noted that the small-diameter recessed portion 52, the medium-diameter recessed portion 54, and the large-diameter recessed portion 56 communicate with each other without being closed. The wall portions 58, 59 are spaced apart from each other in the axial direction.

The expansion punch 42 has a stepped shape whose outside diameter changes in the axial direction. The expansion punch 42 has a small-diameter portion 60 and a large-diameter portion 62. The expansion punch 42 has an inclined portion 64 between the small-diameter portion 60 and the large-diameter portion 62. The inclined portion 64 has an inclined surface having an outside diameter that changes continuously in the axial direction. The outside diameter dps of the small-diameter portion 60 is substantially equal to the inside diameter (dn−2×tn) of a raw tube w (dps≈dn−2×tn). The outside diameter dpb of the large-diameter portion 62 is greater than the inside diameter of the raw tube w (dpb>dn−2×tn).

The length L1 of the large-diameter portion 62 of the expansion punch 42 in the axial direction is greater than the length L0 of the medium-diameter recessed portion 54 of the die 40 in the axial direction (L1>L0). The pressing punch 44 is shaped so as to be fittable in the large-diameter recessed portion 56 of the die 40. The pressing punch 44 may be any of a solid circular cylindrical member and a hollow cylindrical member.

It is noted that the inside diameter dh0 of the small-diameter recessed portion 52 of the die 40 is substantially equal to the outside diameter dn of the raw tube which is substantially equal to the outside diameter of the intermediate portion 30 of the stabilizer 2 (dh0≈dn).

The inside diameter dh1 of the medium-diameter recessed portion 54 is greater than the outside diameter dn of the raw tube and greater than the outside diameter dpb of the large-diameter portion 62 of the expansion punch 42 (dh1>dn, dh1>dpb).

The inside diameter dh2 of the large-diameter recessed portion 56 is greater than a value obtained by adding twice the wall thickness tn of the raw tube to the outside diameter dpb of the large-diameter portion 62 of the expansion punch 42 (dh2>dpb+2×tn). In the present embodiment, a difference between the inside diameter dh2 of the large-diameter recessed portion 56 and the outside diameter dpb of the large-diameter portion 62 of the expansion punch 42 is substantially equal to three times the wall thickness tn of the raw tube (dh2≈dpb+3×tn).

Figure 5A:
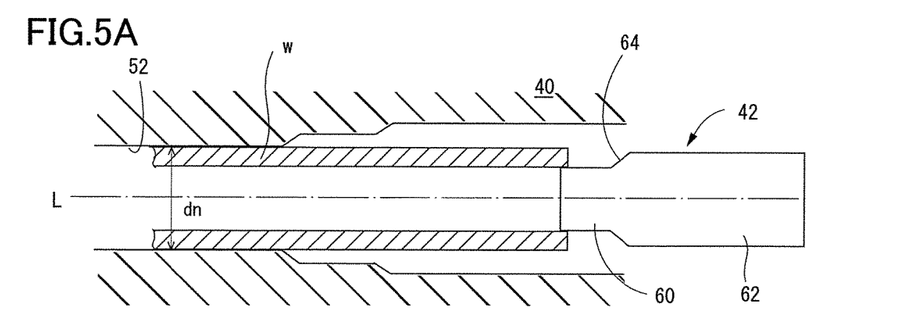
FIG. 5A is a view illustrating a method of manufacturing the stabilizer in a state in which a workpiece is held in a die.

There will be next described the method of manufacturing the stabilizer. As illustrated in FIG. 5A, an outer circumferential surface of a workpiece w as the raw tube is held by the small-diameter recessed portion 52 of the die 40.

Figure 5B:
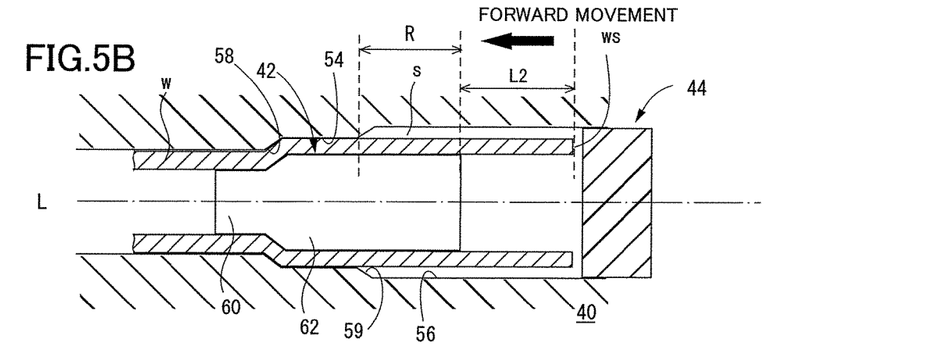
FIG. 5B is a view illustrating the method of manufacturing the stabilizer in a state (a diameter increasing step) in which the diameter of the workpiece is increased by a punch inserted in the workpiece.

As illustrated in FIG. 5B, the expansion punch 42 is moved forward by a drive device, not illustrated, in the direction parallel with the axis L. The expansion punch 42 is inserted into the workpiece w, with the small-diameter portion 60 serving as a front end portion. Specifically, the expansion punch 42 is inserted into a hole formed in the workpiece w on its inner circumferential side. Since the outside diameter of the small-diameter portion 60 of the expansion punch 42 is substantially equal to the inside diameter of the workpiece w, and the inclined portion 64 located between the small-diameter portion 60 and the large-diameter portion 62 has the inclined surface, the large-diameter portion 62 is easily inserted into the workpiece w. The insertion of the large-diameter portion 62 of the expansion punch 42 into the workpiece w deforms the workpiece w so as to increase its diameter at its portions corresponding to the medium-diameter recessed portion 54, the wall portion 59, and the large-diameter recessed portion 56 of the die 40. This process is a diameter increasing step.

It is noted that the expansion punch 42 is inserted until its back end reaches a position that is located on an inner side of a rear end ws of the workpiece w in the axial direction and located at a distance of the length L2 from the rear end ws. The length L2 is set such that the volume of a space s defined within a region R formed by the wall portion 59, an inner circumferential surface of the large-diameter recessed portion 56 of the die 40, and an outer circumferential surface of the large-diameter portion 62 of the expansion punch 42 is substantially equal to the volume of a portion of the workpiece w, the portion being located between the end ws of the workpiece w and a position corresponding to the back end of the expansion punch 42. The space s is formed by an outer circumferential surface of the workpiece w, the inner circumferential surface of the large-diameter recessed portion 56, and a portion of the wall portion 59.

Figure 5C:
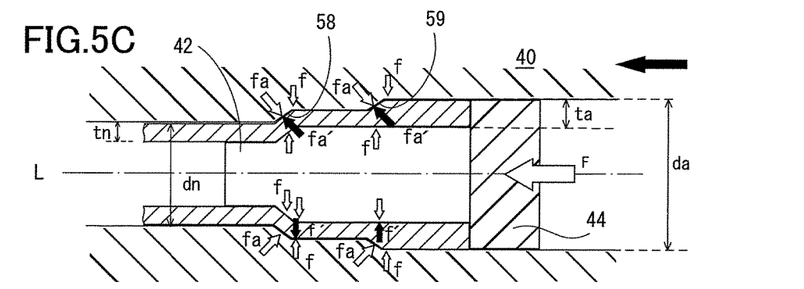
FIG. 5C is a view illustrating the method of manufacturing the stabilizer in a state (a diameter-and-thickness increasing step) in which the workpiece is expanded and thickened by its deformation.

As illustrated in FIG. 5C, the pressing punch 44 is moved forward by the drive device, not illustrated, in the direction parallel with the axis L to a desired position or until the pressing punch 44 is brought into contact with the expansion punch 42. A pressing force F in the axial direction is applied to the rear end ws of the workpiece w via the pressing punch 44, so that an end portion of the workpiece w is deformed so as to be surrounded by the expansion punch 42 and the die 40. In this state, the outside diameter da of the end portion of the workpiece w is substantially equal to the inside diameter dh2 of the large-diameter recessed portion 56 of the die 40, and the wall thickness ta is equal to a distance between the outer circumferential surface of the large-diameter portion 62 of the expansion punch 42 and the inner circumferential surface of the large-diameter recessed portion 56. This process is a diameter-and-thickness increasing step.

In this diameter-and-thickness increasing step, a force due to the pressing force F acts between the workpiece w and each of the die 40 and the expansion punch 42. The workpiece w is to be deformed outward and applies a force f' to the die 40 and the expansion punch 42, so that a restraining force f as a reaction force for the force f' is exerted on the workpiece w from the die 40 and the expansion punch 42. The workpiece w is held between the die 40 and the expansion punch 42 by the restraining force f and deformed so as to be surrounded by the die 40 and the expansion punch 42. Around the wall portions 58, 59, the restraining force f prevents or reduces flow of the workpiece w toward the intermediate portion 30. This restraining force f increases with increase in the pressing force F.

The inclined surfaces of the respective wall portions 58, 59 of the die 40 intersect the axis L and accordingly receive the pressing force F. A sign fa' denotes a vertical component of the pressing force F acting on the wall portions 58, 59, and a sign fa denotes a reaction force for the vertical component fa'. In the case where the thickening ratio is increased, the pressing force F is also increased, but this increase also increases the vertical component fa' acting on the wall portions 58, 59 of the die 40.

If the recessed portion of the die has a single wall portion, the die may be damaged due to an increased force (the sum of the forces f', fa') acting on a portion of the recessed portion around the wall portion as described above. Reduction of the pressing force F can reduce the force acting on the portion around the wall portion, but achieving a large thickening ratio is difficult. Moreover, the expansion punch may be unfortunately deformed by a reaction force fa acting from the wall portion to the expansion punch via the workpiece w.

In the present embodiment, in contrast, the two wall portions 58, 59 are provided at the two portions of the die 40, whereby the force fa' received by each of the wall portions 58, 59 is reduced when compared with the construction in which the single wall portion is provided at one portion of the die. In other words, it is possible to reduce the force acting on the portion around the wall portion (the sum of the forces f', fa') without reduction of the pressing force F (and the restraining force f), thereby preventing damage to the die. Also, the reaction force fa is reduced, making it possible to reduce deformation of the expansion punch 42, which results in longer useful life of the die 40 and the expansion punch 42, for example. Moreover, since the pressing force F does not need to be reduced, a large thickening ratio is achieved. Conversely, it is possible to increase the pressing force F, which may increase the thickening ratio accordingly.

Moreover, since the two wall portions 58, 59 are provided at the two portions of the die 40 in the present embodiment, the diameter of the workpiece w is increased such that two step portions are formed on the workpiece w. This increased diameter may increase the expansion ratio when compared with the construction in which the diameter of the workpiece is increased with one step portion. In view of the above, in the present embodiment, it is possible to perform the expansion and thickening working at low cost and at about 1.5 times the expansion ratio and the thickening ratio without using the end-portion-thickening cylinder. Thereafter, the pressing punch 44 and the expansion punch 42 are moved backward, the die 40 is split, and the workpiece w is taken out.

The expansion and thickening working is performed for each of opposite end portions of the workpiece w in the above-described manner, thereby manufacturing the stabilizer 2 illustrated in FIG. 2. That is, each of the opposite end portions 34, 36 of the stabilizer 2 is expanded such that two step portions are formed on the end portion, whereby each of the opposite end portions 34, 36 is provided with (i) a first large-diameter bar portion 66 having an outside diameter greater than that of the intermediate portion 30 and (ii) a second large-diameter bar portion 68 having an outside diameter greater than that of the first large-diameter bar portion 66. The outside diameter da of the second large-diameter bar portion 68 is about 1.5 times as large as the outside diameter dn of the intermediate portion 30 (da≈dn×1.5). Likewise, the wall thickness ta of the second large-diameter bar portion 68 is about 1.5 times as large as the wall thickness tn of the intermediate portion 30 (ta≈tn×1.5). A polar moment of inertia of area in cross section Ipa of the second large-diameter bar portion 68 is about 5.06 times as large as a polar moment of inertia of area in cross section Ipn of the intermediate portion 30 (Ipa≈5.06×Ipn).

The second large-diameter bar portions 68 of the respective opposite end portions of the stabilizer 2 are welded and fixed to the respective trailing arms 14, 16. Since the polar moment of inertia of the cross section Ipa of the second large-diameter bar portion 68 (the weld portion) of the stabilizer 2 is large, the weld portion has greater torsional stiffness and greater fatigue strength.

Figure 6A:
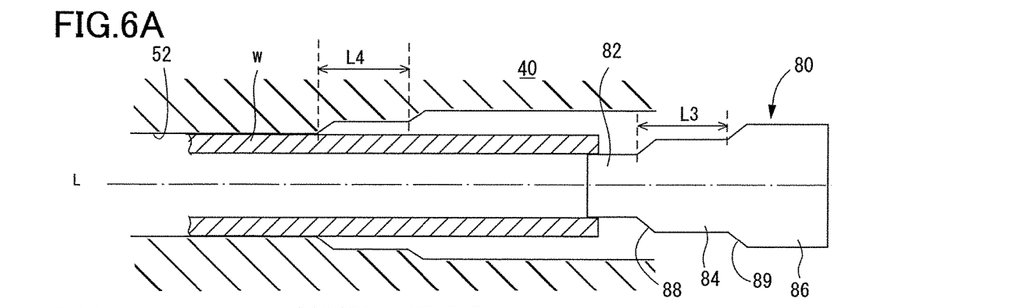
FIG. 6A is a view illustrating a method of manufacturing the stabilizer, according to a second embodiment, in the state in which the workpiece is held in the die.

The outside diameter of the large-diameter portion 62 of the expansion punch 42 used in the manufacturing method according to the present embodiment is less than that of a second large-diameter portion 86 of a second punch 80 used in a manufacturing method according to a second embodiment which will be described below. This construction prevents cracking of the raw tube due to the thinner thickness in the diameter increasing step in the manufacturing method according to the present embodiment. Also, since the second large-diameter bar portion 68 is molded in the diameter-and-thickness increasing step, the expansion ratio is higher than that in the manufacturing method according to the second embodiment.

It is noted that while the die has the recessed portion 50 with the inside diameter that changes with three steps in the above-described embodiment, the die may have a recessed portion with an inside diameter that changes with four steps.

A value obtained by subtracting the outside diameter dpb of the expansion punch 42 from the inside diameter dh1 of the medium-diameter recessed portion 54 of the die 40 may be a value which is greater than or equal to twice as large as the wall thickness tn (dh1−dpb≥2×tn). In this case, when the expansion and thickening working is performed, the workpiece w is also supplied to a space between an inner circumferential surface of the medium-diameter recessed portion 54 and an outer circumferential surface of the expansion punch 42 to expand and thicken the first large-diameter bar portion 66 in addition to the second large-diameter bar portion 68. However, it is not essential to expand and thicken the first large-diameter bar portion 66.

Second Embodiment

There will be next described the method of manufacturing the stabilizer 2 according to the second embodiment with reference to FIG. 6. A metal mold used in a press working machine for the present manufacturing method includes the die 40, a first punch 76, the pressing punch 44, and the second punch 80.

Figure 6B:
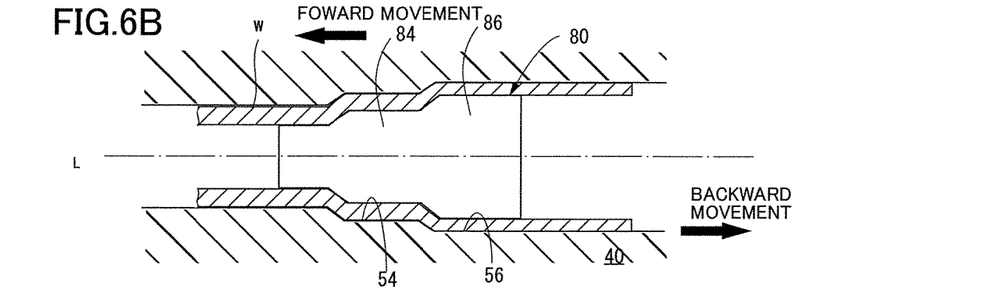
FIG. 6B is a view illustrating the method of manufacturing the stabilizer, according to the second embodiment, in a state (a two-step diameter increasing step) in which the workpiece is expanded with two step portions by a second punch inserted in the workpiece.
Figure 6C:
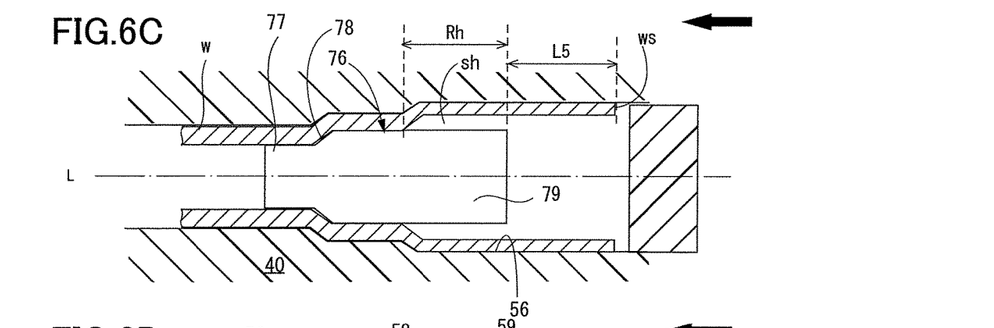
FIG. 6C is a view illustrating the method of manufacturing the stabilizer, according to the second embodiment, in a state (a replacing step) in which the punch is inserted in the workpiece with the second punch being removed.

As illustrated in FIG. 6C, the shape of the first punch 76 is similar to that of the expansion punch 42 in the first embodiment. The first punch 76 includes a small-diameter portion 77, an inclined portion 78, and a large-diameter portion 79 respectively corresponding to the small-diameter portion 60, the inclined portion 64, the large-diameter portion 62.

As illustrated in FIG. 6A, the second punch 80 has a stepped shape and includes a small-diameter portion 82, a first large-diameter portion 84, and the second large-diameter portion 86. The outside diameters of the small-diameter portion 82 and the first large-diameter portion 84 are substantially equal to the outside diameters of the small-diameter portion 77 and the large-diameter portion 79 of the first punch 76, respectively. The outside diameter of the second large diameter portion 86 is greater than the outside diameter of the first large-diameter portion 84. The second punch 80 includes: an inclined portion 88 formed between the small-diameter portion 82 and the first large-diameter portion 84; and an inclined portion 89 formed between the first large-diameter portion 84 and the second large-diameter portion 86. Each of the inclined portion 88 and the inclined portion 89 has an inclined surface having an outside diameter that continuously changes in the axial direction. The length L3 between a small-diameter-portion-side end portion of the inclined portion 88 of the second punch 80 and a first-large-diameter-portion-side end portion of the inclined portion 89 of the second punch 80 is substantially equal to the length L4 between a small-diameter-recessed-portion-side end portion of the wall portion 58 of the die 40 and a medium-diameter-recessed-portion-side end portion of the wall portion 59 of the die 40 (L3≈L4).

As illustrated in FIG. 6A, the workpiece w is held by the small-diameter recessed portion 52 of the die 40. As illustrated in FIG. 6B, the second punch 80 is moved forward by the drive device, not illustrated, in the direction parallel with the axis L. The small-diameter portion 82 of the second punch 80 is first inserted into the workpiece w. The diameter of the workpiece w is increased by the first large-diameter portion 84 and the second large-diameter portion 86 of the second punch 80 such that two step portions are formed on the workpiece w. That is, the workpiece w is expanded by portions of the second punch 80 which respectively correspond to the medium-diameter recessed portion 54 and the large-diameter recessed portion 56 of the die 40. This process is a two-step diameter increasing step.

The second punch 80 is then moved backward and taken out from the workpiece w. As illustrated in FIG. 6C, the first punch 76 is moved forward by the drive device, not illustrated, and inserted into the workpiece w. The first punch 76 is inserted until its back end reaches a position that is located on an inner side of the rear end ws of the workpiece w and located at a distance of the length L5 from the rear end ws. The length L5 is set such that the volume of a space sh defined between an outer circumferential surface of the large-diameter portion 79 of the first punch 76 and the inner circumferential surface of the large-diameter recessed portion 56 is substantially equal to the volume of a portion of the workpiece w, the portion being located between the end ws of the workpiece w and a position corresponding to the back end of the expansion punch 76. The most portion of the space sh is located between an inner circumferential surface of the workpiece w and the outer circumferential surface of the large-diameter portion 79 of the first punch 76, but a space in some cases exists also between the outer circumferential surface of the workpiece w and the inner circumferential surface of the large-diameter recessed portion 56. This process is a replacing step.

Figure 6D:
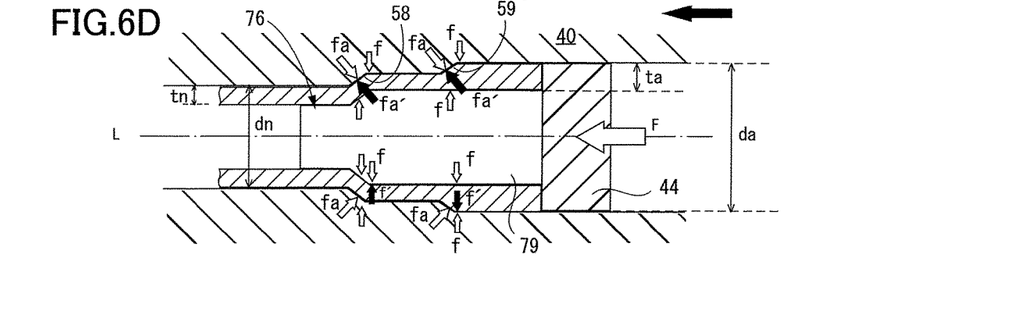
FIG. 6D is a view illustrating the method of manufacturing the stabilizer according to the second embodiment, in a state (a thickness increasing step) in which the workpiece is deformed and thickened.

As illustrated in FIG. 6D, the pressing punch 44 is then moved forward by the drive device, not illustrated, to a desired position or until the pressing punch 44 is brought into contact with the first punch 76. As a result, the end portion of the workpiece w is deformed so as to be surrounded by the die 40 and the first punch 76. This process is a thickness increasing step. In the case where the space sh also exists between the outer circumferential surface of the workpiece w and the inner circumferential surface of the large-diameter recessed portion 56, the diameter of the workpiece w is also increased in reality, but it is possible to consider that the thickening working is principally performed. Thereafter, the pressing punch 44 and the first punch 76 are moved backward, the die 40 is split, and the workpiece w is taken out.

Thus, it is possible to expand the workpiece w with two step portions first and thicken the workpiece w. Also in the present embodiment, it is possible to expand and thicken the workpiece w well at low cost without using the end-portion-thickening cylinder. When compared with the manufacturing method according to the first embodiment, the length L5 can be made less than the length L2 in some cases, and accordingly it is possible to reduce a load applied to the wall portions 58, 59 of the die 40 in the thickness increasing step.

It is noted that the outside diameter of the small-diameter portion 82 of the second punch 80 may be less than the inside diameter dn of the raw tube. The outside diameter of the first large-diameter portion 84 of the second punch 80 may be less than the outside diameter of the large-diameter portion 79 of the first punch 76. In this case, the diameter of the workpiece w is increased by insertion of the first punch 76.

The technique in each of the above-described embodiments may be used not only for working on the opposite end portions of the stabilizer 2 but also for working on one end portion of the stabilizer 2. In this case, the die need not to be separable. While the embodiments have been described above, it is to be understood that the disclosure is not limited to the details of the illustrated embodiments, but may be embodied with various changes and modifications, which may occur to those skilled in the art, without departing from the spirit and scope of the disclosure. Application of the manufacturing methods according to the above-described embodiments is not limited to manufacture of the stabilizer, and the manufacturing methods may be used for manufacture of a component coupled to a suspension arm by welding, for example.

There will be described aspects of the present application.

(1) A stabilizer having a tubular shape, provided so as to extend in a widthwise direction of a vehicle, and coupled to a suspension arm at opposite end portions of the stabilizer, the opposite end portions each comprising:

a first large-diameter bar portion having an outside diameter greater than an outside diameter of an intermediate portion of the stabilizer; and a second large-diameter bar portion having an outside diameter greater than the outside diameter of the first large-diameter bar portion and having a wall thickness greater than a wall thickness of the intermediate portion.

The outside diameter of each of the end portions is increased such that at least two step portions are formed on the end portion in the stabilizer according to this form. With this construction, the stabilizer has large expansion ratio and thickening ratio even in the case where the stabilizer is formed of a high-strength material with low formability.

(2) The stabilizer according to the above form (1), wherein a ratio of the outside diameter da of the second large-diameter bar portion to the outside diameter dn of the intermediate portion is greater than or equal to 1.1 and less than or equal to 2.0 (2.0≥da/dn≥1.1). In some embodiments, the ratio of the outside diameter da of the second large-diameter bar portion to the outside diameter dn of the intermediate portion is greater than or equal to 1.4.

(3) The stabilizer according to the above form (1) or (2), wherein a ratio of the wall thickness ta of the second large-diameter bar portion to the wall thickness tn of the intermediate portion is greater than or equal to 1.1 and less than or equal to 2.0 (2.0≥ta/tn≥1.1). In some embodiments, the ratio of the wall thickness ta of the second large-diameter bar portion to the wall thickness tn of the intermediate portion is greater than or equal to 1.4.

(4) The stabilizer according to any one of the above forms (1) through (3), wherein the stabilizer is welded and fixed to the suspension arm at the second large-diameter bar portions of the opposite end portions.

(5) A manufacturing method of manufacturing a stabilizer by increasing a diameter and a thickness of an end portion of a raw tube using a die and a punch, the raw tube extending in an axial direction, the die comprising a recessed portion having a stepped shape with an inside diameter that changes in the axial direction, the punch comprising a large-diameter portion having an outside diameter greater than an inside diameter of the raw tube, the recessed portion comprising:
a small-diameter recessed portion having an inside diameter equal to an outside diameter of the raw tube;
a medium-diameter recessed portion having an inside diameter greater than the inside diameter of the small-diameter recessed portion; and
a large-diameter recessed portion having an inside diameter greater than the inside diameter of the medium-diameter recessed portion and greater than a value obtained by adding a value that is twice a wall thickness of the raw tube to the outside diameter of the large-diameter portion of the punch,
the manufacturing method comprising:
a diameter increasing step of increasing a diameter of a workpiece as the raw tube by moving the punch forward in the axial direction to insert the punch into an inner circumferential side of the workpiece from an end of the workpiece in a state in which an outer circumferential portion of the workpiece is held by the small-diameter recessed portion of the die; and
a diameter-and-thickness increasing step of increasing the diameter and a thickness of the workpiece by deforming the workpiece by applying a pressing force to the workpiece in the axial direction from the end of the workpiece.

The inside diameter of the small-diameter recessed portion of the die is substantially equal to the outside diameter of the workpiece. The workpiece is held on its outer circumferential surface by the small-diameter recessed portion of the die. The insertion of the large-diameter portion of the punch into the inner circumferential side of the workpiece increases the diameter of the workpiece at its portions corresponding to the medium-diameter recessed portion and the large-diameter recessed portion of the die. The pressing force in the axial direction is then applied to the end portion of the workpiece, whereby the end portion is deformed so as to be surrounded by the die and the punch and is expanded and thickened. As a result, the outside diameter of the end portion of the workpiece is made substantially equal to the inside diameter of the large-diameter recessed portion of the die, and the wall thickness is made substantially equal to a thickness between an inner circumferential surface of the large-diameter recessed portion of the die and the large-diameter portion of the punch. The pressing force in the axial direction which is applied in the diameter-and-thickness increasing step is received by surfaces of the die which intersect the axial direction. That is, the pressing force is received by (i) a wall portion of the die between the small-diameter recessed portion and the medium-diameter recessed portion and (ii) a wall portion of the die between the medium-diameter recessed portion and the large-diameter recessed portion.

(6) The manufacturing method according to the above form (5), wherein at least one of the diameter increasing step and the diameter-and-thickness increasing step is performed without heating.

(7) A manufacturing method of manufacturing a stabilizer by increasing a diameter and a thickness of an end portion of a raw tube using a die, a first punch, and a second punch,
the raw tube extending in an axial direction,
the die comprising a recessed portion having a stepped shape with an inside diameter that changes in the axial direction,
the first punch comprising a large-diameter portion having an outside diameter greater than an inside diameter of the raw tube,
the second punch having a stepped shape with an outside diameter that changes in the axial direction, the second punch comprising: a first large-diameter portion having an outside diameter less than or equal to the outside diameter of the large-diameter portion of the first punch; and a second large-diameter portion having an outside diameter greater than the outside diameter of the large-diameter portion of the first punch,
the recessed portion comprising:
a small-diameter recessed portion having an inside diameter equal to an outside diameter of the raw tube;
a medium-diameter recessed portion having an inside diameter greater than the inside diameter of the small-diameter recessed portion; and
a large-diameter recessed portion having an inside diameter greater than the inside diameter of the medium-diameter recessed portion and greater than a value obtained by adding a value that is twice a wall thickness of the raw tube to the outside diameter of the large-diameter portion of the first punch,
the manufacturing method comprising:
a two-step diameter increasing step of increasing a diameter of an end portion of a workpiece as the raw tube so as to form two step portions on the end portion of the workpiece by moving the second punch forward in the axial direction to insert the second punch into an inner circumferential side of the workpiece in a state in which an outer circumferential portion of the workpiece is held by the small-diameter recessed portion of the die;
a replacing step of moving the second punch backward to an outside of the workpiece and moving the first punch forward to insert the first punch into the workpiece from an end of the workpiece; and
a thickness increasing step of increasing a thickness of the workpiece by deforming the workpiece by applying a pressing force to the workpiece in the axial direction from the end of the workpiece.

In the manufacturing method according to this form, the workpiece is expanded such that two step portions are formed on the workpiece, and thereafter an end portion of the workpiece is thickened. The outside diameter of the second large-diameter portion of the second punch is greater than that of the first large-diameter portion and that of the large-diameter portion of the first punch.

(8) The manufacturing method according to the above form (7), wherein at least one of the two-step diameter increasing step and the thickness increasing step is performed without heating.

(9) The manufacturing method according to the above form (5) or (6), wherein the punch comprises: a small-diameter portion having an outside diameter equal to the inside diameter of the raw tube; and an inclined portion provided between the small-diameter portion and the large-diameter portion and having an outside diameter that changes continuously.

The punch is shaped so as to have the small-diameter portion, the inclined portion, and the large-diameter portion, which facilitates insertion of the large-diameter portion. Also, the outside diameter of the small-diameter portion is substantially equal to the inside diameter of the raw tube, thereby preventing the workpiece from being deformed (i.e., thickened) toward an inner circumferential side in the expansion and thickening working. Likewise, the outside diameter of the small-diameter portion of the first punch is substantially equal to the inside diameter of the raw tube, thereby preventing the workpiece from being thickened toward the inner circumferential side in the thickening working.

(10) The manufacturing method according to the above form (7) or (8), wherein the second punch comprises: a small-diameter portion having an outside diameter less than or equal to the inside diameter of the raw tube; and two inclined portions respectively provided between the small-diameter portion and the first large-diameter portion and between the first large-diameter portion and the second large-diameter portion, the two inclined portions each having an outside diameter that changes continuously.

The outside diameter of the small-diameter portion of the second punch may be less than the inside diameter of the raw tube. The outside diameter of the first large-diameter portion of the second punch may be less than the outside diameter of the large-diameter portion of the first punch. In this case, the diameter of the workpiece w is increased by insertion of the large-diameter portion of the first punch.

(11) A metal mold used for manufacturing a stabilizer by increasing a diameter and a thickness of an end portion of a raw tube extending in an axial direction, the metal mold comprising:
a die comprising a recessed portion having a stepped shape with an inside diameter that changes stepwise in the axial direction; and
a punch comprising a large-diameter portion having an outside diameter greater than an inside diameter of the raw tube,
the recessed portion comprising:
a small-diameter recessed portion having an inside diameter equal to an outside diameter of the raw tube;
a medium-diameter recessed portion having an inside diameter greater than the inside diameter of the small-diameter recessed portion; and
a large-diameter recessed portion having an inside diameter greater than the inside diameter of the medium-diameter recessed portion and greater than a value obtained by adding a value that is twice a wall thickness of the raw tube to the outside diameter of the large-diameter portion of the punch.

The metal mold according to this form may be used for implementation of the manufacturing method according to any one of the above forms (5) through (10). Use of the metal mold according to this form enables manufacture of the stabilizer according to any one of the above forms (1) through (4).

(12) The metal mold according to the above form (11), further comprising a pressing member shaped to be fittable in the large-diameter recessed portion of the die.

What is claimed is:

1. A stabilizer having a tubular shape, provided so as to extend in a widthwise direction of a vehicle, and coupled to a suspension arm at opposite end portions of the stabilizer, the opposite end portions each comprising:
a first large-diameter bar portion having an outside diameter greater than an outside diameter of an intermediate portion of the stabilizer; and
a second large-diameter bar portion having an outside diameter greater than the outside diameter of the first large-diameter bar portion and having a wall thickness greater than a wall thickness of the intermediate portion,
wherein the intermediate portion is positioned between the opposite end portions.

2. The stabilizer according to claim 1, wherein a ratio of the wall thickness of the second large-diameter bar portion to the wall thickness of the intermediate portion is greater than or equal to 1.1 and less than or equal to 2.0.

3. A manufacturing method of manufacturing a stabilizer by increasing a diameter and a thickness of an end portion of a raw tube using a die and a punch,
the raw tube extending in an axial direction,
the die comprising a recessed portion having a stepped shape with an inside diameter that changes in the axial direction,
the punch comprising a large-diameter portion having an outside diameter greater than an inside diameter of the raw tube,
the recessed portion comprising:
a small-diameter recessed portion having an inside diameter equal to an outside diameter of the raw tube;
a medium-diameter recessed portion having an inside diameter greater than the inside diameter of the small-diameter recessed portion; and
a large-diameter recessed portion having an inside diameter greater than the inside diameter of the medium-diameter recessed portion and greater than a value obtained by adding a value that is twice a wall thickness of the raw tube to the outside diameter of the large-diameter portion of the punch,
the manufacturing method comprising:
a diameter increasing step of increasing a diameter of a workpiece as the raw tube by moving the punch forward in the axial direction to insert the punch into an inner circumferential side of the workpiece from an end of the workpiece in a state in which an outer circumferential portion of the workpiece is held by the small-diameter recessed portion of the die; and
a diameter-and-thickness increasing step of increasing the diameter and a thickness of the workpiece by deforming the workpiece by applying a pressing force to the workpiece in the axial direction from the end of the workpiece.

4. The manufacturing method according to claim 3, wherein at least one of the diameter increasing step and the diameter-and-thickness increasing step is performed without heating.

5. The manufacturing method according to claim 3, wherein, in the diameter increasing step, the punch is inserted into the workpiece from the end of the workpiece until a volume of a space defined between an outer circumferential surface of the punch and an inner circumferential surface of the large-diameter recessed portion of the die becomes equal to a volume of a portion of the workpiece, which portion is located between the end of the workpiece and a position corresponding to a back surface of the punch.

6. The manufacturing method according to claim 3,
wherein the punch comprises: a small-diameter portion having an outside diameter equal to the inside diameter of the raw tube; and an inclined portion provided between the small-diameter portion and the large-diameter portion and having an outside diameter that changes continuously, and
wherein each of (i) a wall portion of the die between the small-diameter recessed portion and the medium-diameter recessed portion and (ii) a wall portion of the die between the medium-diameter recessed portion and the large-diameter recessed portion comprises an inclined surface.

7. A manufacturing method of manufacturing a stabilizer by increasing a diameter and a thickness of an end portion of a raw tube using a die, a first punch, and a second punch, the raw tube extending in an axial direction, the die comprising a recessed portion having a stepped shape with an inside diameter that changes in the axial direction, the first punch comprising a large-diameter portion having an outside diameter greater than an inside diameter of the raw tube, the second punch having a stepped shape with an outside diameter that changes in the axial direction, the second punch comprising: a first large-diameter portion having an outside diameter less than or equal to the outside diameter of the large-diameter portion of the first punch; and a second large-diameter portion having an outside diameter greater than the outside diameter of the large-diameter portion of the first punch, the recessed portion comprising:
- a small-diameter recessed portion having an inside diameter equal to an outside diameter of the raw tube;
- a medium-diameter recessed portion having an inside diameter greater than the inside diameter of the small-diameter recessed portion; and
- a large-diameter recessed portion having an inside diameter greater than the inside diameter of the medium-diameter recessed portion and greater than a value obtained by adding a value that is twice a wall thickness of the raw tube to the outside diameter of the large-diameter portion of the first punch, the manufacturing method comprising:
- a two-step diameter increasing step of increasing a diameter of an end portion of a workpiece as the raw tube so as to form two step portions on the end portion of the workpiece by moving the second punch forward in the axial direction to insert the second punch into an inner circumferential side of the workpiece in a state in which an outer circumferential portion of the workpiece is held by the small-diameter recessed portion of the die;
- a replacing step of moving the second punch backward to an outside of the workpiece and moving the first punch forward to insert the first punch into the workpiece from an end of the workpiece; and
- a thickness increasing step of increasing a thickness of the workpiece by deforming the workpiece by applying a pressing force to the workpiece in the axial direction from the end of the workpiece.

8. The manufacturing method according to claim 7, wherein at least one of the two-step diameter increasing step and the thickness increasing step is performed without heating.

9. The manufacturing method according to claim 7, wherein, in the replacing step, the first punch is inserted into the workpiece from the end of the workpiece until a volume of a space defined by an outer circumferential surface of the first punch and an inner circumferential surface of the large-diameter recessed portion of the die becomes equal to a volume of a portion of the workpiece, which portion is located between the end of the workpiece and a position corresponding to a back surface of the first punch.

10. The manufacturing method according to claim 7, wherein the second punch comprises: a small-diameter portion having an outside diameter less than or equal to the inside diameter of the raw tube; and two inclined portions respectively provided between the small-diameter portion and the first large-diameter portion and between the first large-diameter portion and the second large-diameter portion, the two inclined portions each having an outside diameter that changes continuously.

* * * * *

UNITED STATES PATENT AND TRADEMARK OFFICE
CERTIFICATE OF CORRECTION

PATENT NO. : 10,486,487 B2  
APPLICATION NO. : 15/657313  
DATED : November 26, 2019  
INVENTOR(S) : Shuzo Nagano et al.

Page 1 of 1

It is certified that error appears in the above-identified patent and that said Letters Patent is hereby corrected as shown below:

In the Specification

In Column 4, Line 50, delete "wall thickness to" and insert --wall thickness tn--, therefor.

Signed and Sealed this  
Fourth Day of February, 2020

Andrei Iancu  
*Director of the United States Patent and Trademark Office*